United States Patent [19]
Wohlrab

[11] Patent Number: 5,773,050
[45] Date of Patent: Jun. 30, 1998

[54] MOULD CLOSING DEVICE FOR AN INJECTION MOULDING MACHINE

[75] Inventor: Walter Wohlrab, Weissenburg, Germany

[73] Assignee: Krauss-Maffei AG, Munich, Germany

[21] Appl. No.: 632,465

[22] PCT Filed: Dec. 9, 1994

[86] PCT No.: PCT/EP94/04090

§ 371 Date: Apr. 23, 1996

§ 102(e) Date: Apr. 23, 1996

[87] PCT Pub. No.: WO95/17292

PCT Pub. Date: Jun. 29, 1995

[30] Foreign Application Priority Data

Dec. 23, 1993 [DE] Germany .......................... 43 44 340.0

[51] Int. Cl.[6] .................................................. B29C 45/68
[52] U.S. Cl. .......................... 425/589; 425/590; 425/595; 425/450.1; 425/451.9
[58] Field of Search ................................... 425/589, 590, 425/595, 450.1, 451.2, 451.9

[56] References Cited

U.S. PATENT DOCUMENTS

| 4,984,980 | 1/1991 | Ueno | 425/595 |
|---|---|---|---|
| 5,261,810 | 11/1993 | Kamp et al. | 425/590 |
| 5,336,462 | 8/1994 | Wohlrab | 425/595 |
| 5,345,766 | 9/1994 | Leonhartsberger et al. | 60/545 |

FOREIGN PATENT DOCUMENTS

| A 0 381 107 | 8/1990 | European Pat. Off. . |
|---|---|---|
| 37 18 106 A1 | 12/1988 | Germany . |
| A 01 247 810 | 10/1989 | Japan . |
| A 92 11993 | 7/1992 | WIPO . |
| A 94 06614 | 3/1994 | WIPO . |

*Primary Examiner*—James P. Mackey
*Attorney, Agent, or Firm*—Henry M. Feiereisen

[57] ABSTRACT

A mould closing device for an injection moulding machine includes a fixed (1) and a movable (4) mould clamping plate for support of screw drives (36) which are freely rotatable in the fixed mould clamping plate (1) and axially supported in one direction and supported in spindle nuts (39) secured in the movable mould clamping plate (4). Provided for actuation of the screw drives (36) for the closing and opening stroke of the movable mould clamping plate (4) are a rotary drive (44) and a hydraulic piston-cylinder unit (45, 46) interacting with the screw drives for effecting the closing force build-up. To ensure a dimensioning of the actuating drive of the screw drives substantially in accordance with the requirements for rapid opening and closing motions while the hydraulic piston-cylinder unit maintains a high closing pressure, it is proposed to form the hydraulic piston-cylinder unit of one or more pistons and hydraulic cylinders, with the admission of pressure medium for effecting the closing pressure build-up being effected by piston-cylinder units which are driven by the screw drives via interposed pressure transmitting devices (19).

9 Claims, 4 Drawing Sheets

5,773,050

MOULD CLOSING DEVICE FOR AN INJECTION MOULDING MACHINE

BACKGROUND OF THE INVENTION

The invention relates to a mould closing device for injection moulding machines of a type having a fixed mould clamping plate supporting one tool half and a movable mould clamping plate carrying another tool half.

A mould closing device of this type is known from DE 37 18 106 A 1 (construction as shown in FIG. 5), in which the movable mould clamping plate can be propelled in the closing and opening directions by means of spindles supported in the fixed mould clamping plate and in which the closing pressure is built up by means of hydraulic piston-cylinder units which are supported in the fixed mould clamping plate and which act upon the spindles. Where this arrangement is concerned, in addition to the opening and closing travels which have to be performed rapidly, the spindles also assume the full tractive force when the closing force is generated by the hydraulic piston-cylinder units. Therefore, the spindles have to be designed to handle the movement as well as the closing force function, which means that they have to be made relatively heavy.

Furthermore, known from EP 0 381 107 A2 is a mould closing device in which spindles mounted in the fixed mould clamping plate are coupled to the movable mould clamping plate by means of spindle nuts which produce in the opening and closing movements via a rotary drive. Since the closing pressure is built up via hydraulic piston-cylinder units which are braced on the spindle nuts, then here, too, the spindles have to be designed so that they can absorb the tractive forces resulting from the high closing pressure.

SUMMARY OF THE INVENTION

Therefore, the invention is based on the problem of so further developing a mould closing device of the aforementioned type while ensuring the high closing pressure by a hydraulic piston-cylinder unit, the movement drive by means of spindles only has to be designed to meet the demands for rapid opening and closing movements.

This object is attained in accordance with the present invention by providing a screw drive mechanism including a spindle having axial ends, with one axial end rotatably supported in the fixed mould clamping plate and another end being received in a spindle nut operatively connected to the movable mould clamping plate, a rotary drive for actuating the screw drive mechanism to effect a travel of the movable mould clamping plate in closing and opening directions, first hydraulic main piston-cylinder units operatively connected to the screw drive mechanism for building up a closing force, wherein the movement of and transmission of force for the movable mould clamping plate during opening and closing is effected during rapid movement solely by the screw drive mechanism, and wherein the main piston-cylinder units include one or a plurality of main pistons and main cylinders which are acted upon for build-up of the closing force by pressurized medium applied by second piston-cylinder units driven by the screw drive mechanism via interposed pressure amplification.

Advantageous further developments and measures according to the invention are indicated in dependent claims.

BRIEF DESCRIPTION OF THE DRAWINGS

The invention is explained in greater detail hereinafter with reference to three embodiments shown in the accompanying drawings, in which.

DETAILED DESCRIPTION OF PREFERRED EMBODIMENTS

Figure 1:
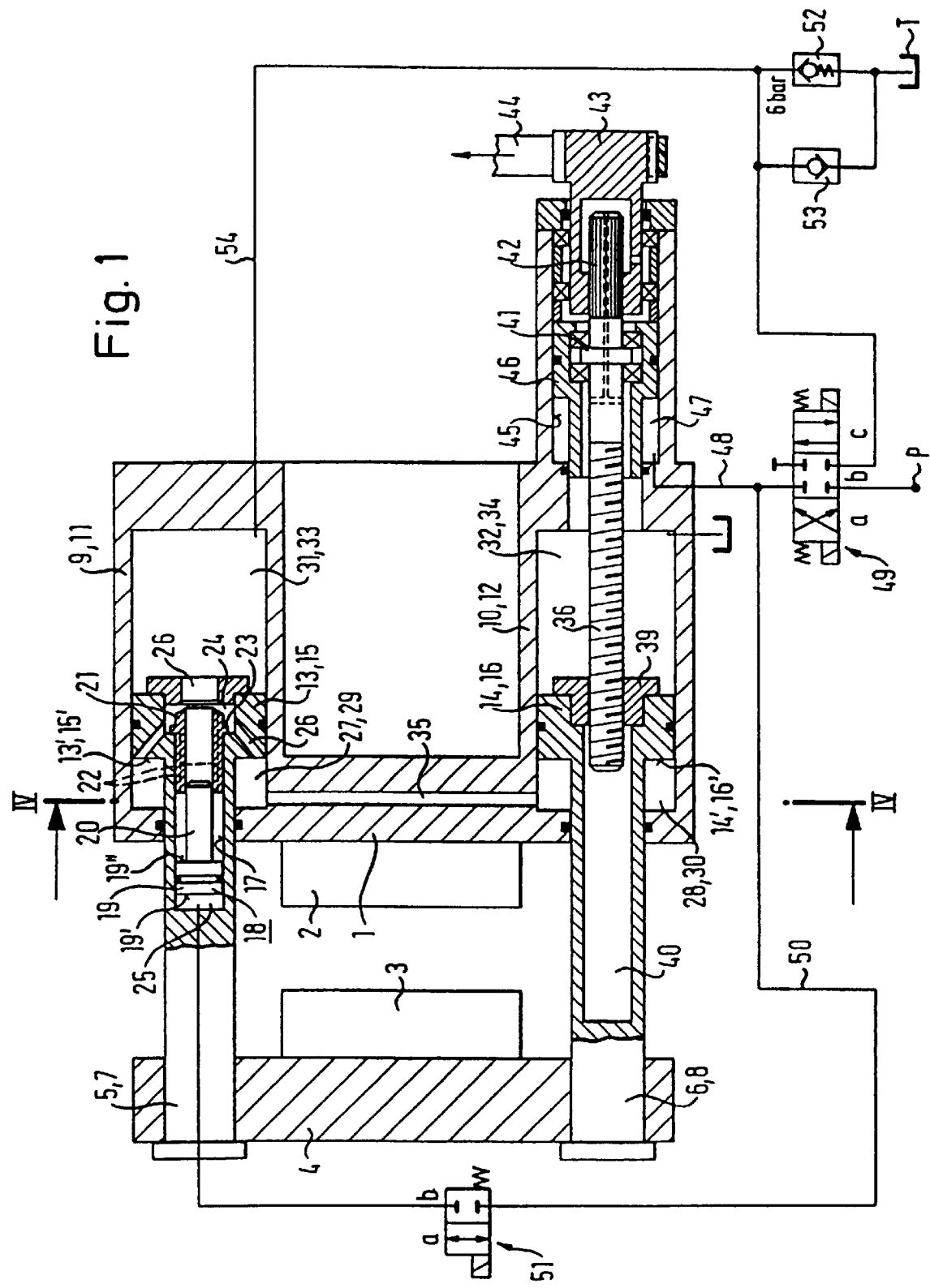
FIG. 1 shows a diagrammatic longitudinal section through a mould closing device of an injection moulding machine and taken along the line I—I in FIG. 4.

FIG. 1 shows a mould closing device for an injection moulding machine and comprising a fixed mould clamping plate 1 with a first tool half 2 and with a movable mould clamping plate 4 carrying the second tool half 3 and in which are fixed four piston-column units 5 to 8 which pass through the fixed mould clamping plate 1 by being guided for displacement in this latter in four main hydraulic cylinders 9 to 12 with pistons 13 to 16.

The four piston-column units 5 to 8 consist of two types, of which the piston-column units 5 and 7 are equipped in each case with a pressure amplification while the piston-column units 6 and 8 are in each case equipped with a screw drive mechanism.

The pressure amplification of the piston-column units 5 and 7 includes in each case of a pressure amplifying cylinder 17 in which is guided a two-stage pressure amplifying piston 18 comprising a larger thrust piston 17 corresponding to the diameter of the pressure amplifying cylinder 19 and a smaller thrust piston 20 enclosed by a valve body consisting of a valve sleeve 21. In its outside diameter, the valve sleeve 21 corresponds substantially to the diameter of the pressure amplifying cylinder 17 and is guided for axial displacement in this latter as well as in respect of the smaller thrust piston 20. The valve sleeve 21 has on its outer surface at least one axially continuous groove 22. The axial displaceability of the valve sleeve 21 is limited in the direction of closure by the outer ring abutment 23 and in the opening direction by abutments acting between the end part of the smaller thrust piston 20 and the end part on the inner periphery of the valve sleeve 21.

The pressure amplifying piston 18 sub-divides the pressure amplifying cylinder 17 into a closure-side pressure amplifying space 24 and an opening-side pressure amplifying space 25.

The pressure amplifying space 25 on the opening-side is a constituent part of a port 26 in the piston 13, 15 which sub-divides the main hydraulic cylinder 9, 11 into a closure-side cylinder space 27, 28 and an opening-side cylinder space 31, 32. The port 26 can be closed by the valve sleeve 21.

In the same way, the pistons 14 and 16 of the piston-column units 6 and 8 each of which is equipped with a screw drive mechanism, sub-divide these main cylinder spaces 10 and 12 into closure-side cylinder spaces 29 and 30 and opening-side cylinder spaces 33 and 34.

All the closure-side cylinder spaces 27, 28 and 29, 30 are connected to one another by ports 35.

The screw drive mechanism of the piston column units 6 and 8 includes in each case of a spindle 36, 37, 38 which is in screw threaded engagement with a spindle nut 39 fixed in the piston 14, 16 and which fits into a recess 40 in the piston-column arrangement 6 and 8.

The spindles 36, 37, 38 further comprise an axial bearing 41 and an end part 42 by which the spindle is axially displaceable coupled to a rotary drive, of which only one drive pinion 43 is shown but which is adapted to be driven by a belt transmission 44 with a servomotor and with a positioning adjusting means. Preferably, the servomotor is an electric motor.

Figure 2:
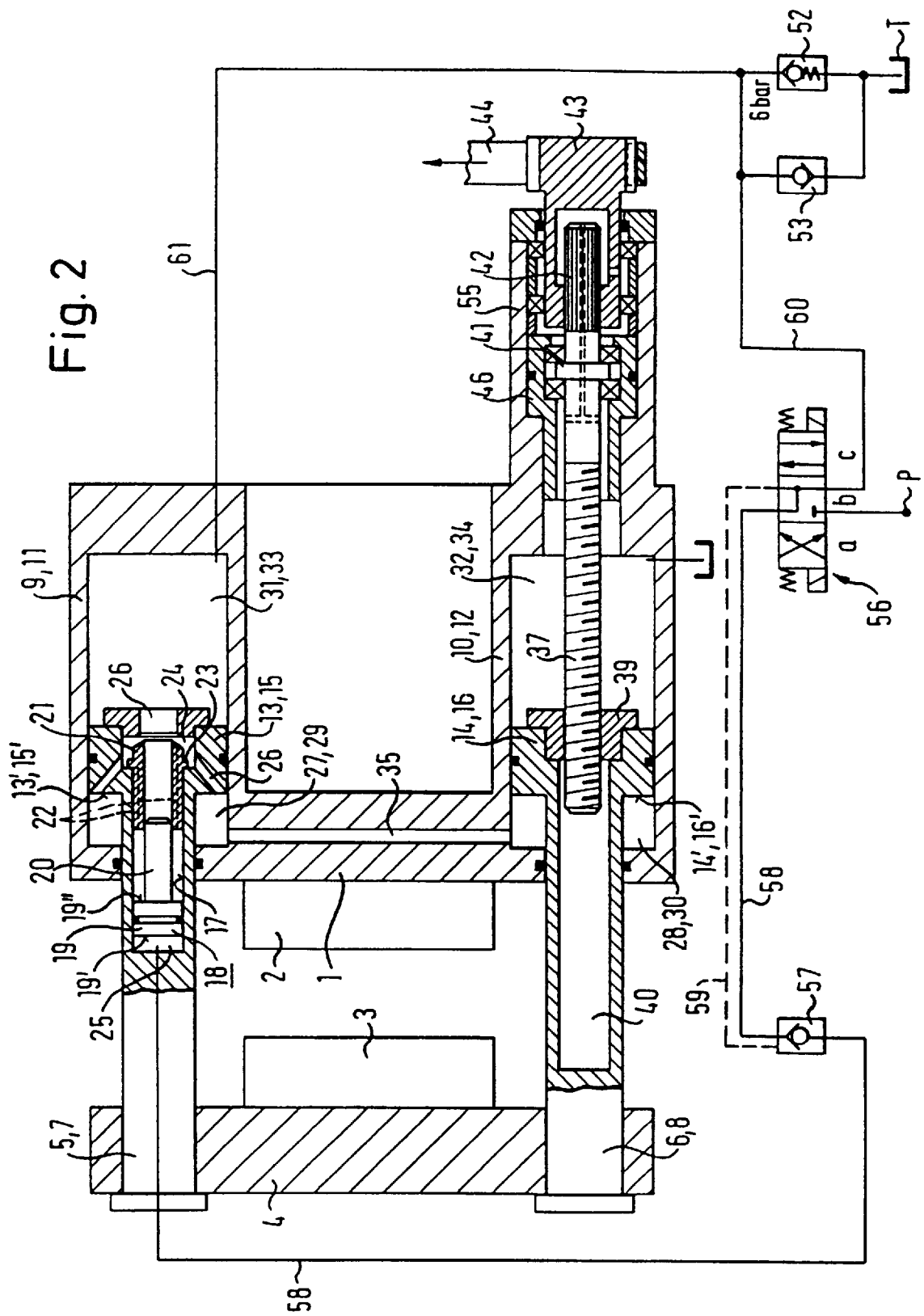
FIG. 2 is a diagrammatic longitudinal section through another embodiment of mould closing device.
Figure 3:
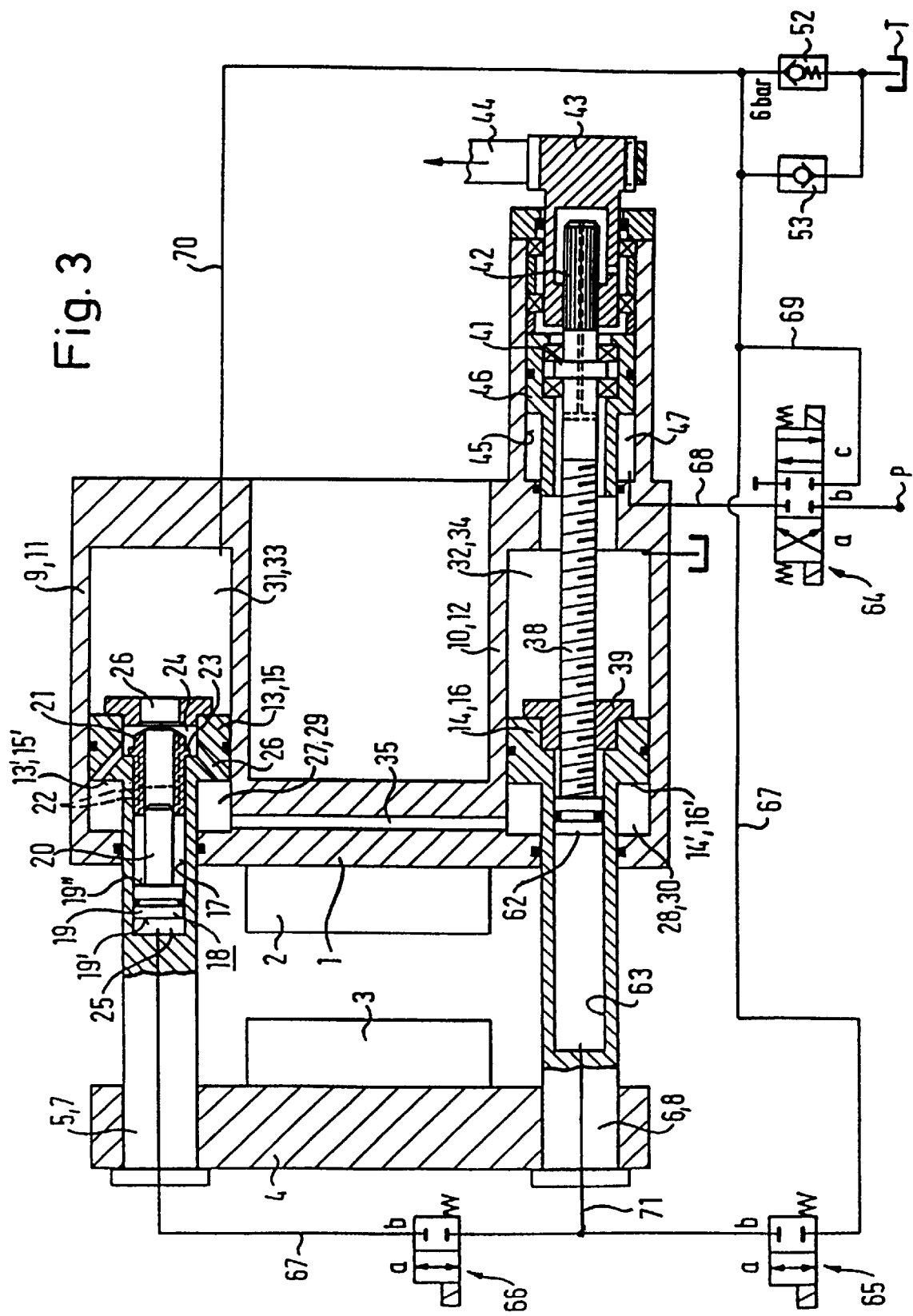
FIG. 3 is a diagrammatic longitudinal section through a further embodiment of mould closing device.
Figure 4:
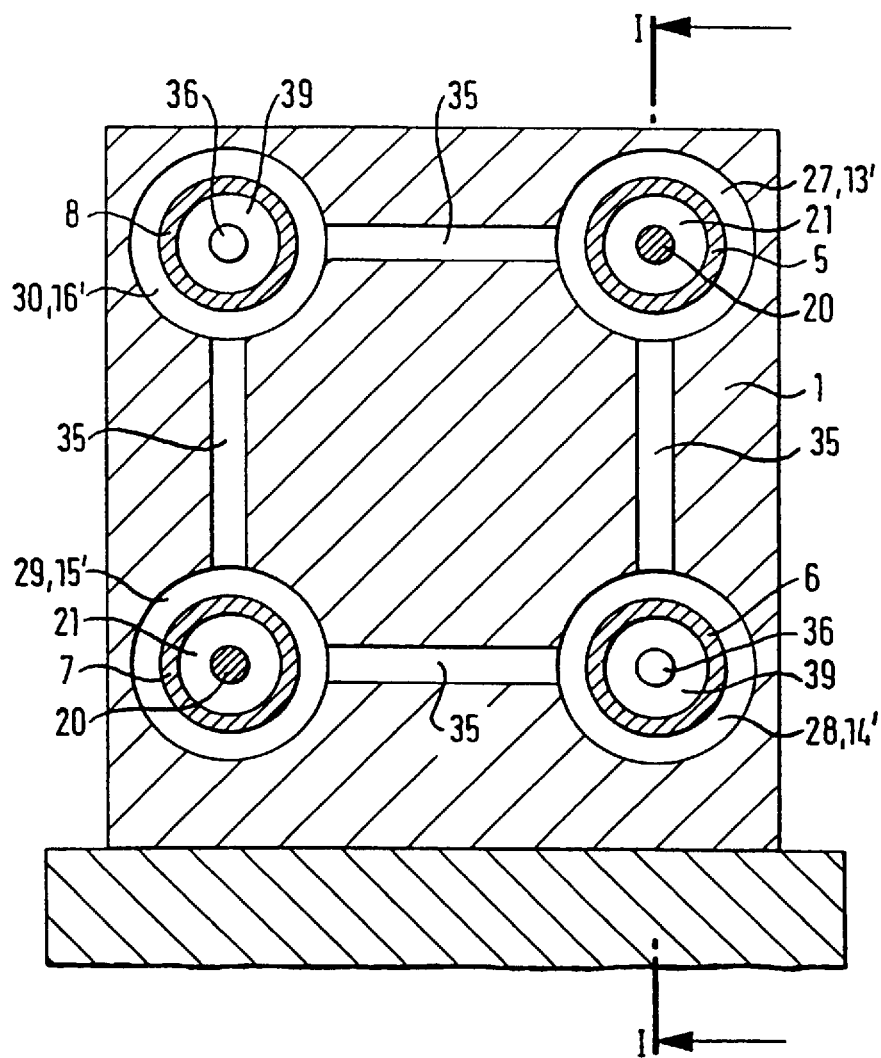
FIG. 4 shows a cross-section taken on the line IV—IV in FIG. 1 and jointly applicable to the mould closing devices shown in FIGS. 1 to 3.

The afore described features and means are identically in the three embodiments shown in FIGS. 1 to 3. Hereinafter, therefore, only the peculiarities of the respective embodiments are described.

1. Embodiment Shown in FIG. 1

1.1 Design

The spindle 36 in the embodiment shown in FIG. 1 passes through the opening-side cylinder space 32 and projects into an adjacent second cylinder space 45 in which the axial bearing 41 of the spindle 36 is mounted in a piston unit 46 which sub-divides the second cylinder space 45 into a second closure-side cylinder space (not present in the switched position of the piston unit 46 a s illustrated).

From the second closure-side cylinder space 47, a hydraulic line 48 leads to a first multi-way valve 49 (4/3-way valve) with switching positions a, b and c. From the hydraulic line 48, a hydraulic line 50 branches off to a second multi-way valve 51 (4/2-way valve) with switching positions a and b by which a connection can be made or broken between the second closure-side cylinder space 47 and the opening-side thrust cylinder space 25. Via the first multi-way valve 49, the hydraulic line 48 can be switched optionally to a pressurized medium source P or via a non-return valve 52 with back pressure (6 bars) to the tank T. Via a second non-return valve 53 which functions as a secondary section valve, hydraulic fluid can be drawn from the tank T. The opening-side cylinder space 31 is connected by a hydraulic line 54 and the non-return valve 52 with back pressure to the tank T.

1.2 Functional Description 1.2.1 Closure of the Mould Closing Device, Rapid Movement For this, the second closure-side cylinder space 47 is subjected to pressurized medium from the source P via the position c of the first multi-way valve 49, whereupon the piston unit 46 assumes the right-hand position of abutment shown in FIG. 1. The second multi-way valve 51 is in switched position b, ensuring that the pressure amplifying piston 18 maintains the valve sleeve 21 in the position shown in FIG. 1 in which the passage or port 26 between the closure-side cylinder space 27 and the opening-side cylinder space 31 is open.

By rotation of the spindle 36, the two halves 2 and 3 of the tool are moved towards each other until they abut each other. Due to the fact that the spindle 31 is driven by an electric servomotor with a position adjustment facility, precise positioning is possible. During the movement of the tool halves 2 and 3 towards each other, there is a redistribution of the hydraulic fluid from the opening-side cylinder spaces 31 and 33 via the ports 26 and passages 35 to the closure-side cylinder spaces 27 to 30, any shortage of hydraulic fluid being replaced via the line 54 and the secondary suction valve 53.

1.2.2 Closure Pressure Build-Up

For this, the first multi-way valve 49 is moved to position b and the second multi-way valve 51 to position a. Upon further rotation of the spindle 36 in the closure direction, the piston unit 46 in the illustration in FIG. 1 is displaced leftwardly whereupon the hydraulic fluid contained in the second closure-side cylinder spaces 47 passes through the hydraulic lines 48 and 50 and the second multi-way valve 51 and into the opening-side pressure amplifying space 25 and causes a displacement of the pressure amplifying piston 18 and of the valve sleeve 21 so that at first the valve sleeve 21 closes the port 26. Further displacement of the pressure amplifying piston 18 produces by virtue of the differential pressure surfaces 19' and 19" an increase in pressure which propagates via the continuous groove 22 in the valve sleeve 21 and generates the required closure pressure at the annular piston surfaces 13' to 16'.

1.2.3 Pressure Dissipation

In order to relieve the closure pressure acting on the annular piston surfaces 13' to 16', the second multi-way valve 51 is moved to switched position a and the first multi-way valve 49 to switched position a, whereupon the pressure amplifying piston 18 is switched to the tank T in a pressureless condition. The second closure-side cylinder space 47 is connected to the pressurized medium source P so that the piston unit is reset in the abutment position shown in FIG. 1.

1.2.4 Opening of the Mould Closing Device, Rapid Movement

For this stage, the first and the second multi-way valves 49 and 51 are moved into the same switched position as when carrying out the closure process but the direction of rotation of the spindles 36 is reversed, so that the tool halves 2 and 3 move away from each other.

2. Embodiment Shown in FIG. 2

2.1 Design

Where th e embodiment shown in FIG. 2 is concerned, the spindle 37 is, by means of an axial bearing 41, freely rotatably but axially non-displaceable mounted in a housing 55 adjacent the main hydraulic cylinder 10. The hydraulic system includes a pressurized medium source P, a multi-way valve 56 w ith switched positions a, b and c, a freely switchable non-return valve 57, a secondary suction valve 53, a non-return valve 52 with back pressure, a tank T an d hydraulic lines 58 to 61.

2.2 Functional Description 2.2.1 Closure of the Mould Closing Device, Rapid Movement For this, the multi-way valve 56 is switched to the position b shown in FIG. 2 ensuring that the passage 26 in the piston 13, 15 remains open so that upon rotation of the spindle 37 and of the movement of the tool halves 2 and 3 towards each other which this produces, the hydraulic fluid is able to flow out of the opening-side cylinder spaces 31 and 33 into the closure-side cylinder spaces 27 to 30, any lack of fluid being drawn in via the secondary suction valve 53 and the hydraulic line 61. Rotation of the spindle 37 is stopped when the two halves 2 and 3 of the tool have come to rest on each other.

2.2.2 Closure Pressure Build-Up

To achieve this, the multi-way valve 56 is moved to position c in which the hydraulic fluid passes from the pressurized medium source P through the hydraulic line 58 and into the closure-side pressure amplifying space 24 producing, by means of the pressure amplifying piston 18, the build-up of the closure pressure which is described with reference to 1.2.2.

2.2.3 Pressure Dissipation

To relieve the closure pressure acting on the annular piston surfaces 12' and 16', the multi-way valve 56 is moved to switch position a in which, via the hydraulic line 59, the non-return valve 57 is cleared, whereupon the pressure biasing the pressure reducing (sic!) piston 18 is able to expand to the tank T via the hydraulic lines 58 and 60.

2.2.4 Opening of the Mould Closing Device, Rapid Movement

For this phase, the multi-way valve 56 is moved to switch position b. By rotation of the spindle 37 so that the tool halves 2, 3 move apart, a pressure is generated in the closure-side cylinder spaces 27 which, via port 26, produces a resetting of the pressure amplifying piston 18 and of the valve sleeve 21 into the position shown in FIG. 2 so that the port 26 between the closure-side cylinder spaces 27, 29 is completely clear so that upon the movement apart, it is possible for the volumes between the closure-side cylinder spaces 27 to 30 and the opening-side cylinder spaces 31 to 33 to become equalized. Excess hydraulic fluid is discharged to the tank T via the hydraulic line 61.

3. Embodiment Shown in FIG. 3

3.1 Design

The drive-side part of the spindle 38 in FIG. 3 corresponds to the spindle 36 in FIG. 1. At the end which fits into the piston-column unit 6 (8) the spindle 38 has a hydraulic spindle piston 62 guided in a spindle cylinder 63. The hydraulic system includes of a pressurized medium source P, a first multi-way valve 64 with three switch positions a to c, a second multi-way valve 65 with switch positions a and b and a third multi-way valve 66 with switch positions a and b.

The afore described multi-way valves 64 to 66 are connected by hydraulic lines 67 to 70 to the opening-side pressure amplifying space 24, the spindle cylinder 63, the second closure-side cylinder space 47, the opening-side cylinder space 31, 33 and the tank T.

3.2 Functional Description 3.2.1 Closure of the Mould Closing Device, Rapid Movement For this, the first multi-way valve 64 is switched to position c, causing the second closure-side cylinder space 47 to be exposed to pressurized medium from the pressurized medium source P and the piston unit 46 assumes the right-hand abutment position shown in FIG. 3. The second multi-way valve 65 is switched to position a whereby, upon the movement together of the two halves 2 and 3 caused by rotation of the spindle, the hydraulic fluid displaced from the spindle cylinder 63 by the spindle piston 62 is able to flow through the hydraulic line 67 to the tank T. The third multi-way valve 66 is switched to position b, ensuring that the pressure amplifying space 18 and the valve sleeve 21 remain in the position shown in FIG. 3 in which, when the pistons 13 to 16 travel into the closure position, there is an exchange of fluids between the opening-side cylinder spaces 31 and 33 and the closure-side cylinder spaces 27 to 30.

3.2.2 Closure Pressure Build-Up

For this, the first multi-way valve 64 is switched to position a so that the hydraulic fluid contained in the second closure-side cylinder space 47 is able to flow through the hydraulic line 69 to the tank T when the spindle 38 is further rotated while the pistons 13 to 16 are in the closed position, so that the spindle piston 62 can penetrate farther into the spindle cylinder 63 in order to generate hydraulic pressure which is to be applied to the pressure amplifying piston 18. Since the pistons 13 to 16 are in the closed position, in which the tool halves 2 and 3 rest on each others, rotation of the spindle 38 produces a displacement of the piston unit 46 to the left by the amount by which the spindle piston 62 penetrates the spindle cylinder 63. The second multi-way valve 65 is then switched to position b and the third multi-way valve 66 is switched to position a so that the hydraulic pressure generated in the spindle cylinder 63 can be conveyed via a line 71 and the line 67 to the pressure amplifying piston 18. By means of the pressure amplifying piston 18, there is then an increase in pressure appropriate to the build-up of closure force, in accordance with the functional description under 1.2.2.

3.2.3 Pressure Dissipation

In order to relieve the closure pressure acting on the annular piston surfaces 13' to 16', the first multi-way valve 64 is switched to position a so that the second closure-side cylinder space 47 is in a secondary suction state of communication with the tank T. The second multi-way valve 65 and the third multi-way valve 66 are both switched to position a so that the pressure from the opening-side pressure amplifying space 25 and the spindle cylinder 63 is able to expand to the tank T.

3.2.4 Opening of the Mould Closing Device, Rapid Movement

For this, the first multi-way valve 64 is switched to position c in which the second closure side cylinder space 47 is exposed to the action of pressurized medium from the pressurized medium source P, so that the piston unit 46 is pushed into the abutment position shown in FIG. 3. To this end, there is at the same time a rotation of the spindle 38 to allow a resetting of the piston unit 46 so that after this reaches its abutment, the opening movement can be performed. The second multi-way valve 65 is switched to position a so that hydraulic fluid can be drawn through the hydraulic lines 68 and 67 from the tank T and passed into the spindle cylinder 63. The third multi-way valve 66 is switched to position b, ensuring that the pressure amplifying piston 18 and the valve sleeve 21 are in the retracted position, opening the port 26 so that during the opening movement there is an unhindered exchange of fluids between the closure-side cylinder spaces 27 to 30 and the opening-side cylinder spaces 31 and 33, excess fluid being capable of being discharged to the tank T via hydraulic line 61.

I claim:

1. A mould closing device for an injection moulding machine having a fixed mould clamping plate supporting one tool half and a movable mould clamping plate carrying another tool half, said mould closing device comprising:

at least one piston-column unit of a first type having one end secured in the movable mould clamping plate and another end received in a first main cylinder secured to the fixed mould clamping plate;

at least one piston-column unit of a second type having one end secured in the movable mould clamping plate at a distance to the piston-column unit of the first type and another end received in a second main cylinder secured to the fixed mould clamping plate;

a screw drive mechanism for moving the moveable mould clamping plate with respect to the fixed mould clamping plate to thereby effect a rapid closing and opening of the tool halves, said first type of piston-column unit being provided for support of the screw drive mechanism; and force application means for buildup of a clamping force when the tool halves abut each other through operation of the screw drive mechanism, said force application means including a pressure amplifying unit acted upon by hydraulic fluid under pressure, without subjecting the screw drive mechanism to the application of the clamping force, said second type of piston-column unit being provided for support of the pressure amplifying unit.

2. The mould closing device of claim 1, including two piston-column units of the first type secured to the movable mould clamping plate in one diagonal opposite disposition and two piston-column units of the second type secured to the movable mould clamping plate in another diagonal opposite disposition.

3. The mould closing device of claim 1 wherein the first type of piston-column unit includes a piston received in the first main cylinder, said screw drive mechanism including a spindle having opposite axial ends, with one axial end of the spindle being rotatably supported in the first main cylinder and with the other axial end threadably engaged in a spindle nut placed in the piston of the first type of piston-column unit.

4. The mould closing device of claim 3 wherein the force application means further includes a piston-cylinder unit connected to the screw drive mechanism such that a rotation of the screw drive mechanism effects an axial displacement of the piston-cylinder unit when the tool halves abut one another, thereby causing hydraulic fluid to act upon the pressure amplifying unit.

5. The mould closing device of claim 3 wherein the force application means further includes a source of hydraulic fluid for supplying hydraulic fluid under pressure to generate the clamping force acting upon the pressure amplifying unit when the tool halves abut one another through actuation of the screw drive mechanism.

6. The mould closing device of claim 4 wherein the piston of the first type of piston-column unit subdivides the first main cylinder into a closure-side cylinder space and an opening-side cylinder space, and wherein the second type of piston-column unit includes a piston subdividing the second main cylinder into a closure-side cylinder space and an opening-side cylinder space, said closure-side cylinder spaces of the first and second main cylinders being connected to one another via a passageway, said pressure amplifying unit including a pressure amplifying piston having differential piston surfaces, a pressure amplifying cylinder and a valve body, wherein the pressure amplifying piston subdivides the pressure amplifying cylinder into a closure-side pressure amplifying space and an opening-side pressure amplifying space, said valve body being displaceable between a first position in which a port is opened to fluidly connect the closure-side cylinder space to the opening-side cylinder space and a second position in which the port is closed to prevent a fluid connection between the closure-side cylinder space to the opening-side cylinder space, said spindle having one end received in a cylindrical recess of the first type of piston-column unit and another end traversing the first main cylinder and being guided by and traversing through the piston-cylinder unit of the force application means for operative connection to a rotary drive, said piston-cylinder unit of the force application means including a piston and a hydraulic cylinder receiving the piston for subdividing the hydraulic cylinder of the piston-cylinder unit into a closure-side cylinder space and an opening-side cylinder space, wherein in a first operative stage of the mould closing device a first multi-way valve is actuated as to connect the closure-side cylinder space of the piston-cylinder unit to a source of hydraulic fluid, and a second multi-way valve is actuated to interrupt a passageway from the closure-side cylinder space of the piston-cylinder unit to its opening-side pressure cylinder space, with the pressure amplifying piston and the valve body occupying a basic position in which the port is open, wherein in a second operative stage the closure-side cylinder space of the piston-cylinder unit is connectable to the opening-side pressure amplifying space, with the first multi-way valve and the second multi-way valve being actuated to connect the closure-side cylinder space of the piston-cylinder unit with the opening-side pressure amplifying space, wherein in a third operative stage the first multi-way valve and the second multi-way valve are actuated as to render the closure-side cylinder space of the piston-cylinder unit and the opening-side pressure amplifying space pressureless through connection of the pressure amplifying piston to an expansion tank, and wherein in a fourth operative stage the first multi-way valve and the second multi-way valve are actuated in correspondence to the first operative stage.

7. The mould closing device of claim 4 wherein the piston of the first type of piston-column unit subdivides the first main cylinder into a closure-side cylinder space and an opening-side cylinder space, and wherein the second type of piston-column unit includes a piston subdividing the second main cylinder into a closure-side cylinder space and an opening-side cylinder space, said closure-side cylinder spaces of the first and second main cylinders being connected to one another via a passageway, said pressure amplifying unit including a pressure amplifying piston having differential piston surfaces, a pressure amplifying cylinder and a valve body, wherein the pressure amplifying piston subdivides the pressure amplifying cylinder into a closure-side pressure amplifying space and an opening side pressure amplifying space, said valve body being displaceable between a first position in which a port is opened to fluidly connect the closure-side cylinder space to the opening-side cylinder space and a second position in which the port is closed to prevent a fluid connection between the closure-side cylinder space to the opening-side cylinder space, said spindle being guided by a spindle piston in a spindle cylinder of the first type of piston-column unit and another end traversing the main cylinder and being guided by and traversing through the piston-cylinder unit of the force application means for operative connection to a rotary drive, said piston-cylinder unit of the force application means including a piston and a hydraulic cylinder for receiving the piston for subdividing the hydraulic cylinder of the piston-cylinder unit into a closure-side cylinder space and an opening-side cylinder space, wherein in a first operative stage of the mould closing device a first multi-way valve is actuated as to subject the closure-side cylinder space of the piston-cylinder unit to hydraulic fluid from a fluid source, a second multi-way valve is actuated as to vent the spindle cylinder to an expansion tank, and a third multi-way valve is actuated as to interrupt a passageway to the pressure amplifying piston, wherein in a second operative stage the first multi-way valve is actuated as to expand the hydraulic fluid contained in the closure-side cylinder space of the piston-cylinder unit through connection to the expansion tank, while the second multi-way valve and the third multi-way valve are actuated as to block a passageway to the expansion tank and to connect the spindle cylinder to the opening-side pressure amplifying space, wherein in a third operative stage the first multi-way valve is actuated to expand the hydraulic fluid contained in the closure-side cylinder space of the piston-cylinder unit through fluid connection to the expansion tank, while the second multi-way valve and the third multi-way valve are actuated in such a manner that the pressure from the opening-side pressure amplifying space and the spindle cylinder is expanded through fluid connection to the expansion tank, and wherein in a fourth operative stage in correspondence to the first operative stage, the first multi-way valve is actuated as to connect the closure-side cylinder space of the piston-cylinder unit to the fluid source, the second multi-way valve is actuated as to allow aspiration of hydraulic fluid from the expansion tank into the spindle cylinder, and the third multi-way valve is actuated as to interrupt a passageway to the opening-side pressure amplifying space.

8. The mould closing device of claim 1 wherein the pressure amplifying unit includes a pressure amplifying piston which exhibits a first piston part of relatively greater diameter and a second piston part of relatively smaller diameter, a valve body mounted on the second piston part for axial displacement and including a valve sleeve which is coupled to the pressure amplifying piston in such a manner that the valve sleeve follows a displacement of the pressure amplifying piston in a direction opposite to the piston, said valve sleeve having a periphery formed with an axial groove for allowing passage of hydraulic fluid from the second main cylinder to a facing annular piston surface of the pressure amplifying piston.

9. The mould closing device of claim 5 wherein the piston of the first type of piston-column unit subdivides the first main cylinder into a closure-side cylinder space and an opening-side cylinder space, and wherein the second type of piston-column unit includes a piston subdividing the second main cylinder into a closure-side cylinder space and an opening-side cylinder space, said closure-side cylinder spaces of the first and second main cylinders being connected to one another via a passageway, said pressure amplifying unit including a pressure amplifying piston having differential piston surfaces, a pressure amplifying cylinder and a valve body, wherein the pressure amplifying piston subdivides the pressure amplifying cylinder into a closure-side pressure amplifying space and an opening-side pressure amplifying space and the valve body is displaceable between a first position in which a port is opened to fluidly connect the closure-side cylinder space to the opening-side cylinder-space and a second position in which the port is closed to prevent a fluid connection between the closure-side cylinder space to the opening-side cylinder space, said spindle having one end received in a cylindrical recess of the first type of piston-column unit and another end traversing the first main cylinder and being guided by and traversing through the piston-cylinder unit of the force application means for operative connection to a rotary drive, said spindle nut being secured in the piston of the first type of piston-column unit and threadably engaged by the spindle which has one end received in a cylindrical recess of the first type of the piston column unit and another end traversing the second main cylinder and being guided by an axial bearing and operatively connected to a rotary drive, wherein in a first operative stage of the mould closing device a first multi-way valve is actuated as to vent the opening-side pressure amplifying space to an expansion tank in a substantially pressureless state, wherein in a second operative stage in which the tool halves abut each other, the multi-way valve is actuated as to connect the opening-side pressure amplifying space of the pressure amplifying unit to the source of hydraulic fluid, wherein in a third operative stage, the multi-way valve is actuated as to allow an expansion of hydraulic fluid from the opening-side pressure amplifying space to the expansion tank, and wherein in a fourth operative stage, the multi-way valve is actuated to allow disposition of the pressure amplifying unit in a position which keeps the port open.

* * * * *